Aug. 18, 1925.  1,549,875
G. H. HORNE
METHOD OF SEPARATING POORLY CONDUCTING FIBROUS AND GRANULAR MATERIALS
Filed Nov. 23, 1921   4 Sheets-Sheet 1
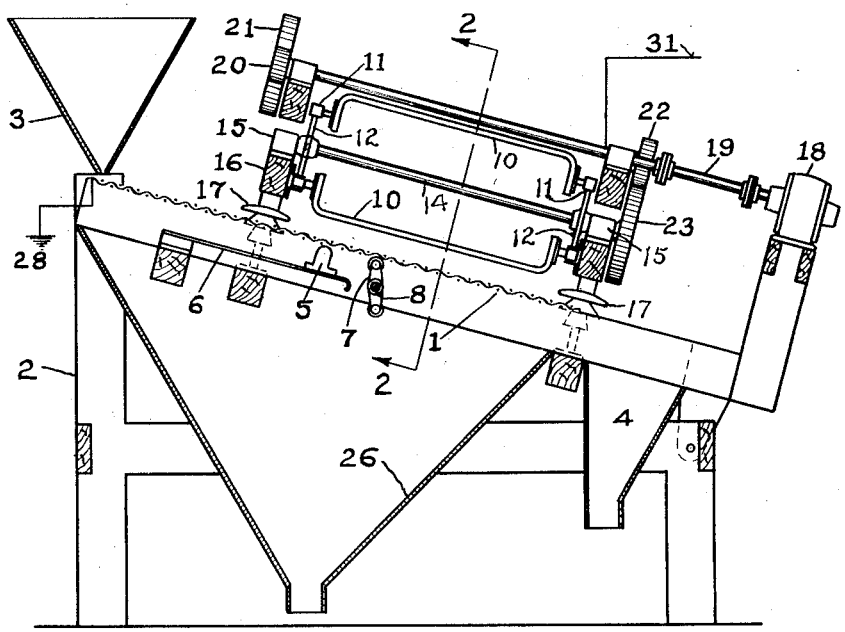
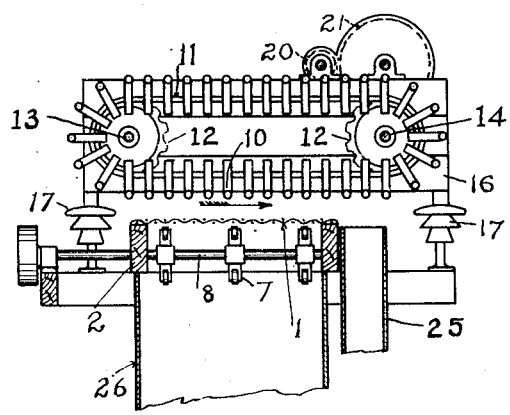
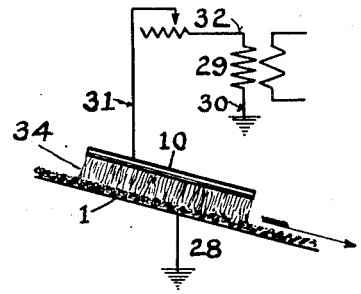
INVENTOR.
George H. Horne
BY Arthur P. Knight
ATTORNEY

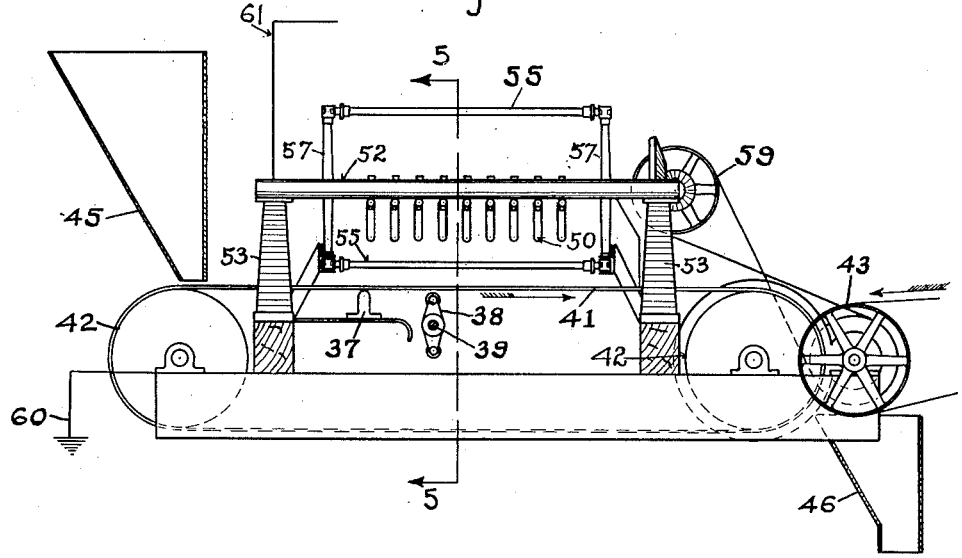
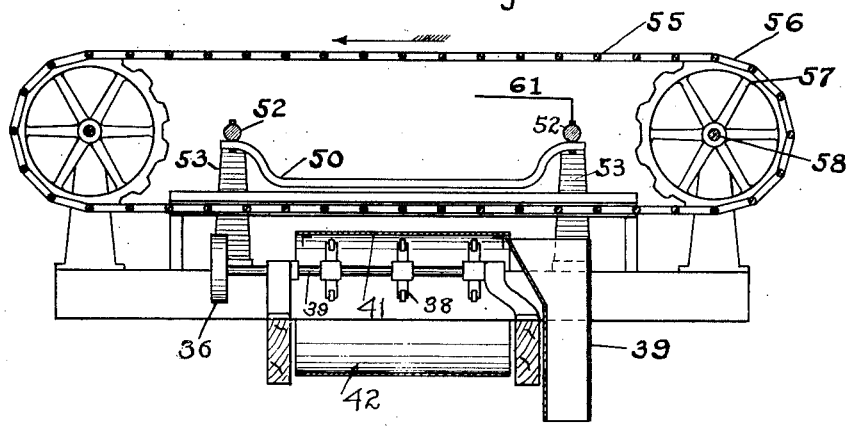

Aug. 18, 1925.  
G. H. HORNE  
1,549,875  
METHOD OF SEPARATING POORLY CONDUCTING FIBROUS AND GRANULAR MATERIALS  
Filed Nov. 23, 1921  
4 Sheets-Sheet 3

INVENTOR.  
George H. Horne  
BY Arthur P. Knight  
ATTORNEY.

Aug. 18, 1925.

G. H. HORNE 1,549,875

METHOD OF SEPARATING POORLY CONDUCTING FIBROUS AND GRANULAR MATERIALS

Filed Nov. 23, 1921  4 Sheets-Sheet 4

INVENTOR.
George H. Horne
BY Arthur P. Knight
ATTORNEY

Patented Aug. 18, 1925.

1,549,875

UNITED STATES PATENT OFFICE.

GEORGE H. HORNE, OF GLENDALE, CALIFORNIA, ASSIGNOR TO INTERNATIONAL PRECIPITATION COMPANY, OF LOS ANGELES, CALIFORNIA, A CORPORATION OF CALIFORNIA.

METHOD OF SEPARATING POORLY-CONDUCTING FIBROUS AND GRANULAR MATERIALS.

Application filed November 23, 1921. Serial No. 517,232.

*To all whom it may concern:*

Be it known that I, GEORGE H. HORNE, a citizen of the United States, residing at Glendale, in the county of Los Angeles, State of California, have invented a new and useful Method of Separating Poorly-Conducting Fibrous and Granular Materials, of which the following is a specification.

This invention relates particularly to the separation of asbestos or similar materials from gangue or rock containing, or mixed with, asbestos. It will be understood, however, that the invention is also applicable to the separation of other poorly conducting and non-inflammable fibrous materials from granular or non-fibrous materials with which they are mixed.

The main object of the present invention is to provide for efficient and economical separation of the asbestos from gangue or rock mixed therewith and to effect this operation more rapidly, economically and effectively than can be done with the methods now in general use.

Figure 6:
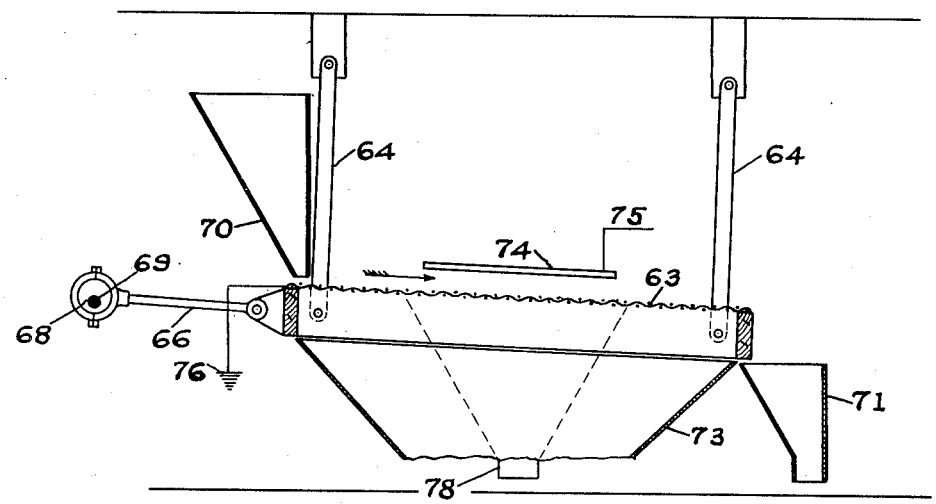
Figure 7:
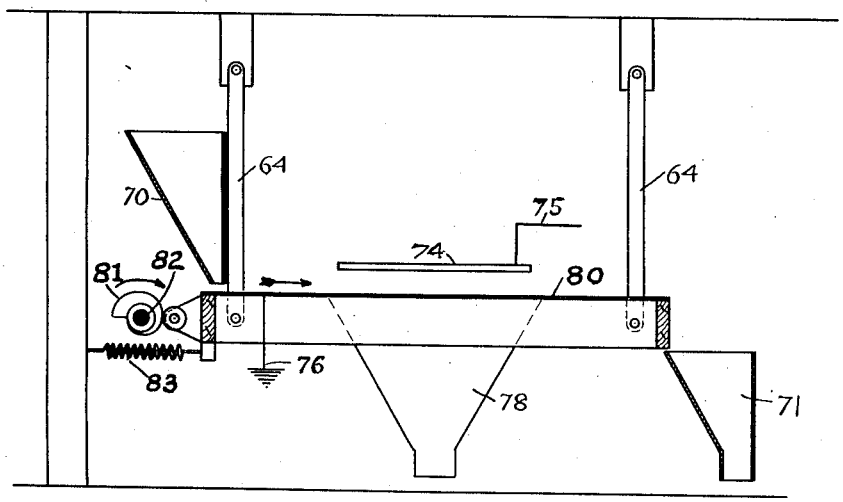
Figure 8:
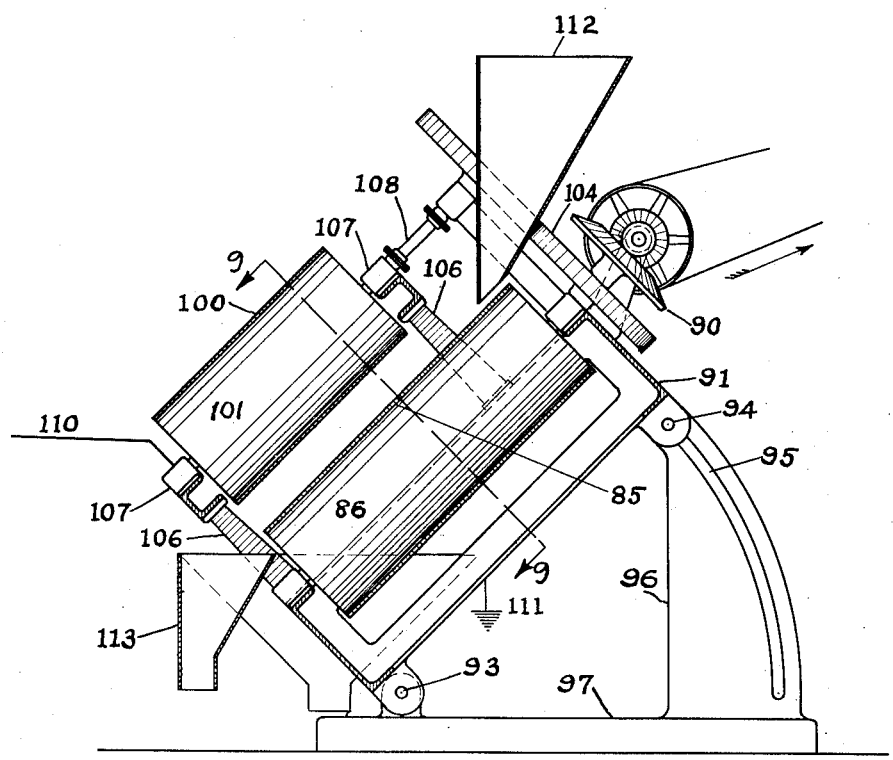
Figure 9:
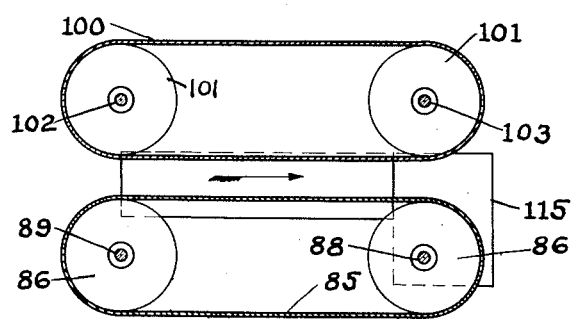

The accompanying drawings illustrate various forms of apparatus suitable for carrying out the invention and referring thereto, Fig. 1 is a longitudinal section of one form of the separating apparatus. Fig. 2 is a section on line 2—2 in Fig. 1. Fig. 3 is a diagrammatic view illustrating the method of operation. Fig. 4 is a longitudinal section of another form of apparatus adapted for carrying out the invention. Fig. 5 is a section on line 5—5 in Fig. 4. Figs. 6 to 8 are longitudinal sections of other forms of apparatus suitable for carrying out the invention. Fig. 9 is a section on line 9—9 in Fig. 8.

Referring to Figs. 1 and 2, the apparatus therein shown comprises a material-supporting member 1, formed as a plate or screen, mounted on a frame 2. Feed means such as a hopper 3 for supplying material to be separated is provided at the upper end of the supporting member 1 and a discharge means or outlet chute 4 is provided at the lower end of the supporting member 1 for carrying away the granular or non-fibrous material. Means are preferably provided for agitating, shaking or jarring the supporting member 1 for facilitating and expediting the travel of the material thereover, and to more effectively loosen up the material so as to facilitate the separating action. For this purpose a hammer device 5 may be mounted on a spring 6 and operated by arms or tappets 7 on a rotating shaft 8 driven by any suitable means, so as to cause vibration of such hammer device which is thereby caused to rap or jar the supporting member 1. In case supporting member 1 is formed as a screen, a hopper or chute 26 is provided below same to receive the "fines."

Above the supporting member 1 electrode means are provided for producing an electrostatic field capable of acting on the fibrous material on the supporting member 1 so as to cause separation thereof from the granular or non-fibrous material. In the embodiment shown in Figs. 1 and 2 said electrode means is illustrated as movable over the surface of the supporting member 1, said electrode means consisting, for example, of metallic bars 10, carried by chains 11 mounted to run over sprocket wheels 12 on two shafts 13 and 14, mounted in bearings 15 on a frame 16, said frame 16 being mounted by means of insulators 17 on the frame 2, so that the electrode system, including the electrode bars 10, is insulated from the stationary part of the apparatus. Any suitable means may be provided for effecting operation of the movable carrier devices for the electrode means aforesaid, such driving means comprising for example a motor 18, whose shaft is connected through an insulating shaft 19 and gearing 20, 21, 22 and 23, to shaft 14 aforesaid, whereby the said shaft is caused to rotate at a comparatively low speed, and to cause the electrode members 10 to pass slowly over the surface of the material supporting member 1. The mounting of the movable electrode means above described is such that the travel of said electrode means is transverse to the supporting member 1 and to the direction of travel of the material on said supporting member, and as shown in Fig. 2, the said movable electrode means projects at one end beyond one side of the said supporting member 1 and a delivery chute 25 is provided at that side of supporting member 1 and below such projecting portion of the movable electrode means so as to receive and carry away the fibrous material which is carried from the supporting member 1 by the operation of the moving electrode means.

The electrode system above described is connected to any suitable source of high potential, either direct or alternating, by means of a wire 31 leading to such source, and the supporting member 1 is grounded, as indicated at 28, constituting, in effect, a grounded electrode.

The method of carrying out my invention using the above described apparatus is as follows:

The material to be separated, consisting for example of asbestos rock crushed to a suitable stage of division for example about 4 to 20 mesh, and containing asbestos fibers and granular or non-fibrous gangue, is supplied from the hopper 3 to the supporting means 1, a suitable feed means being provided in said hopper if necessary to produce a gradual and regular feed. The material travels down and along the supporting member 1, by gravitative action, such travel being expedited by the agitation of the material by the jarring of supporting member 1 by the means 5, 6, 7 and 8. The material is thereby caused to travel in a relatively thin bed or layer over the supporting member 1 and under the electrodes 10. Those electrodes 10 which are adjacent to the material supporting member 1 extend substantially parallel to the surface of said material supporting member and are arranged as close thereto as is compatible with the maintenance of the electrostatic field without excessive disruptive discharge. Supporting member 1 being grounded and the electrode system being connected by the wire 31 to a source of high potential, there is maintained between the lower electrodes 10 and the supporting member 1 a potential difference of say from 20,000 to 50,000 volts, such voltage being either unidirectional or alternating according to whether connection is made directly to an alternating current source, or such connection is made through a rectifier. I find that alternating current is equally as effective as direct current for the purpose of this invention.

In this connection it may be stated that in order to permit use of alternating current the fibrous material to be separated, while of a poorly conducting nature, should at the same time possess sufficient conductivity to permit dissipation of electric charge through the fibers upon reversal of the direction of the electrical field. Asbestos fibers, for the separation of which this process is particularly adapted, possess sufficient conductivity for this purpose and at the same time are of sufficiently poor conductivity to prevent short-circuiting between the electrodes. The term "poorly conducting fibrous materials" as used herein should therefore be understood to mean materials which have a conductivity of the same order as asbestos fibers and therefore meet the above requirements in that respect. By the action of the electrostatic field between the electrodes 10 and the supporting member 1, the fibrous constituent of the material traveling on said supporting member 1 is caused to set itself in the direction of the lines of force of such electrostatic field so as to be extended between the electrodes 10 and the electrode 1 and to become suspended from the electrodes 10, hanging between said electrodes and the layer of material on the member 1. This operation causes the fibrous material to be withdrawn from the body or bed of the material traveling over the supporting member 1 and to adhere at the upper ends of the fibers thereof to the electrodes 10 while the lower ends of the fibers rest on or in contact with the bed of material so that as said electrodes 10 move transversely over the supporting member 1 the fibrous material is dragged laterally over the bed or layer of material on supporting member 1 and is eventually carried off to one side of said supporting member; and as the electrodes move away from the position directly above the supporting member 1 the electrostatic field becomes sufficiently weakened to enable the asbestos fibers to drop by gravity from the electrodes and to fall into the delivery chute 25, whereby they are conducted to any suitable receiving means. In case the supporting member 1 is formed as a screen or pervious member, the shaking action and the travel of the material over said member will cause any fine material to fall through the screen and into the discharge hopper 26. Such removal of the "fines" from the coarser granular material assists in some cases, the separation of the asbestos fibers from the gangue. In other cases it may be preferable to form the supporting member 1 as an impervious plate, the granular material traveling thereover and being eventually discharged at the discharge chute 4. In carrying out such a process of separation of fibrous material from the granular material a portion of the granular material is generally present as fines that is to say in finely divided condition. In such case, whether or not a simultaneous separation between the fine and coarse granular material is made by forming the supporting member 1 as a screen, it is of especial advantage that the fibers, after being elongated between the electrodes by the action of the electrical field, are removed from the electrical field by mechanical means as above described instead of by blowing them out of the field with a blast of air, as is sometimes done in other types of electro-static separators. In this manner the fibers are removed while the air or other gaseous medium around the bed of material and between the electrodes is maintained quiet and undisturbed, thus eliminating loss of fines or contamination of the asbestos fibers by such fines, which would inevitably result if air flotation were used for this purpose, due to the tendency of the air blast to pick up the fine material and carry it along with the asbestos fibers.

My improved method of separating fibrous from granular material may be further explained with reference to Fig. 3, in which the circuit connections are indicated diagrammatically, the electrode system indicated at 10 being connected to one side of the secondary coil of a high tension step-up transformer 29 having its other side grounded at 30. An adjustable resistance is preferably provided in the circuit as indicated at 32. The mixture of asbestos and granular material being caused to travel over the supporting member 1, by gravity or otherwise, is subjected to the action of an electric field maintained between the electrode 10 and the grounded supporting member or surface 1, with the result that the fibers of asbestos tend to place themselves in the direction of the electrostatic lines of force in said field, and are thereby lifted from out of the body of material and caused to be suspended between the members 10 and 1, and to extend from the bed of material upwardly to the overlying electrode as indicated at 34. The fibrous material adhering to the electrode 10 may then be removed by withdrawing the electrode laterally or otherwise from the supporting member 1 or it may be removed by stripping it from the electrode by suitable means.

Figs. 4 and 5 illustrate an embodiment of the invention through which the removal of the fibrous material from the electrodes is effected by stripping action. In these figures the supporting means for the material to be treated is shown as consisting of an endless belt or conveyor 41 traveling over and supported by rolls 42, one of which is operated by driving means 43 to cause the top of the conveyor to slowly advance in the direction of the arrow in Fig. 4. A feed hopper 45 is provided for supplying the material to one end of said conveyor and a suitable delivery chute 46 is provided at the other end thereof for carrying away the granular material, the conveyor being in this case imperforate so that all of the nonfibrous material will be delivered to said chute 46. If found desirable, suitable hammer means, indicated at 37, may be provided for jarring the conveyor, said hammer means being operated by tappets 38 on a shaft 39, driven by suitable means indicated at 36. The electrode system in this case is shown as stationary and consists of metallic or other conducing electrodes 50 formed as rods mounted on bars 52, which are supported by insulators 53, the electrodes 50 extending transversely of the conveyor 41 and sufficiently close to same to enable an electrostatic field of proper strength to be maintained between the said electrodes and the conveyor.

Suitable stripping means are provided for removing the fibrous materials from the electrodes and comprising, for example, rods 55 carried by endless chains or cables 56 which travel over and are supported by wheels 57 mounted on shafts 58; one of said shafts being provided with driving means 59 for effecting rotation thereof, so as to cause gradual movement of the lower run of the chain between the electrodes 50 and the conveyors 41. The conveyor 41 is grounded as indicated at 60, and the electrode system comprising electrodes 50 and frame bars 52 is connected by a wire 61 to any suitable source of high potential, unidirectional or alternating.

The operation of this form of the invention is substantially the same as above described except that the travel of the material is effected by the advancing movement of the supporting member 41 and the removal of the fibrous material adhering to the electrodes is effected by the stripping or sweeping action of the rods 55, which, as they move transversely of the supporting member 41 and between said member and the electrodes 50, push the fibrous material ahead of them and cause it to be eventually carried over one side of the supporting member and to be discharged into the chute 39. Rods 55 are of insulating material.

Various other modifications may be made in the construction and operation of the apparatus; for example, as shown in Fig. 6 the supporting member, indicated at 63, may be mounted by suspension links 64, or otherwise in the manner of a shaking table or screen, said supporting member 63 being either perforate or imperforate as may be preferred, and being connected by a link 66 to suitable means for effecting reciprocation thereof, such as an eccentric 68 on a shaft 69 driven by any suitable means. A feed hopper 70 is provided for supplying material to one end of the shaking supporting member 63, which is inclined so as to cause the material to gradually advance from the point of supply from the feed hopper 70 to the further end thereof and to be discharged into a delivery chute 71 or other receiving means. In case the supporting member 63 is formed as a screen, a hopper 73 may be provided for receiving the "fines" as above described. The electrode system, indicated at 74, is supported and insulated in any suitable manner and is connected by a wire 75 to a suitable source of high electric potential, the supporting member 63 being grounded as indicated at 76. Suitable means, not shown, are provided for removing from the electrode means 74 the fibrous material adhering thereto and causing the same to be delivered to a receiving chute 78. For this purpose either one of the devices above described may be utilized.

The embodiment of the invention illustrated in Fig. 7 is similar to that shown in Fig. 6, except that the material-supporting member indicated at 80 is shown as imperforate and the shaking motion thereof is effected by a differential head motion or otherwise, so as to cause the material to advance over the said supporting member by reason of such differential motion. For example, the supporting member may be moved in one direction by a cam 81 on a driving shaft 82 mounted and driven in any suitable manner, and is operated in the reverse direction by a spring 83 so as to have a quick return and to cause the material to be advanced over the supporting member 80 in the direction of the arrow. The mounting operation of the parts may be otherwise similar to the corresponding parts in Fig. 6 and are indicated by like numerals.

As an alternative method of procedure, the granular material may be caused to pass laterally from the supporting means therefor and be thereby removed from the fibrous material. Figs. 8 and 9 illustrate an apparatus suitable for carrying out the operation in this manner, the supporting member being formed as an endless belt conveyor 85 carried by rolls 86 mounted on shafts 88 and 89, shaft 89 being provided with driving means indicated at 90 for causing gradual movement of the conveyor and said shafts 88 and 89 being mounted in bearings on a supporting frame 91 in such manner that the conveyor 85 is transversely inclined. If desired the supporting frame 91 may be adjustable to vary the inclination of the conveyor, said frame being, for example, pivoted and mounted at 93 and having a set screw 94, which is adjustable in a slot 95 in a standard 96 on base 97.

The high tension electrode means in this case is shown as an endless belt 100, carried by rolls 101 on shafts 102 and 103, shaft 103 being connected to shaft 89 aforesaid by gearing 104, so as to cause the opposing portions of the two endless belts 85 and 100 to travel in the same direction either at the same or different speed, or if desired, in opposite directions. It is preferred, however, to have the two belts travel at substantially the same speed so as to minimize the disturbing action on the fibrous material stretched between these parts. The belt 100 constituting the high tension electrode is so mounted as to be insulated from the rest of the apparatus, for example, by means of insulators 106 supporting the bearings 107 in which the shafts 102 and 103 are journalled, and the shaft 103 includes an insulating section 108 of wood or other suitable insulating material. The high tension electrode means above described is connected by a wire 110 to a suitable source of high potential and the supporting member 85 for the material is grounded as indicated at 111. Suitable feed means indicated at 112 is provided for feeding the material to the upper part of the supporting member 85 near one end thereof, and a discharge delivery chute, 113, for granular material is provided below the lower edge of such supporting member.

In the operation of this form of my invention, the material to be operated upon is supplied to the supporting member 85 near the upper edge and near one end thereof and descends by gravity along the supporting member 85, so as to pass transversely over the latter and toward the discharge chute 113. In this operation it is also carried forwardly by the advancing movement of the supporting member 85 so as to become distributed between said supporting member and the high tension electrode means 100 and by reason of the electrostatic field maintained between said members 100 and 85, acting as electrodes, the fibrous material (asbestos) contained in the material being treated is caused to set itself between the electrodes and to extend across the field from one electrode to the other and to adhere to the upper electrode means 100, whereby it is gradually carried forward in the movement of said electrode 100 and is eventually carried outside of the electrostatic field and falls by gravity into a discharge chute 115, see Fig. 9.

In each of the forms of the invention above described the upper and lower electrodes are separated solely by a gaseous dielectric, namely, atmospheric air in and through which the electric field is maintained by the potential difference between the electrodes. The fibrous material is therefore permitted to extend completely across the electric field and to make contact with both the opposing electrodes, this resulting in maximum separating effect and being rendered possible by the nonconducting nature of the asbestos or similar material being operated upon.

Various other modifications may be made in the construction and operation of the apparatus without departing from my invention.

The method above described is applicable only to the separation of fibrous materials such as asbestos, which are poorly-conducting and non-inflammable as the fibers have to set themselves across the field in such manner that they would form short circuits between the electrodes if they were not nonconducting, and the presence of more or less disruptive discharge or sparking being unavoidable, any inflammable fibers would be liable to be burnt.

I have found it extremely desirable to provide for hammering or knocking the screen or surface on which the material is being supported during the separating operation, by hammer means operating upwardly upon the material supporting surface so as to produce repeated upward blows or impacts thereon (as described in connection with the apparatus shown in Figs. 1 to 5), in order to free the asbestos fibers from lumps in which they may have become entangled. In the absence of such knocking or jarring operations, there is a tendency, wherever comparatively large stones or fragments are present in the material, for the material to bunch around such fragments and to pass through the field without separation of the fibers therefrom, but by violently jarring the supporting surface, the heavy fragments around which the accumulation or bunching occurs are thrown clear of the bunched material and the fibers are thereupon allowed to rise from the bed under the action of the electrostatic field.

What I claim is:

1. The method of separating asbestos or other poorly conducting and non-inflammable fibrous material from non-fibrous material which consists in subjecting a mixture of such materials to the action of an electrical field between conducting electrodes in such manner as to cause the fibrous material to set itself in the direction of electrical force in the field and to extend between the electrodes and to be thereby separated from the non-fibrous material, said electrodes being separated only by a gaseous dielectric, so that such fibrous material may extend in contact with each of the opposing electrodes, and causing the fibrous material, while so extended to be moved transversely to the electrical field by mechanical means, so as to be removed from the electrical field, and from the non-fibrous material without causing disturbance of the gaseous medium in contact with such non-fibrous material, said electrodes being separated only by a gaseous dielectric, so that such fibrous material may extend in contact with each of the opposing electrodes.

2. The method which consists in passing a mixture of poorly-conducting and non-inflammable fibrous material and non-fibrous materials between conducting electrodes extending one above another and maintained at high potential difference, said electrodes being separated from one another solely by a gaseous dielectric, moving the lower electrode to advance the material between the electrodes, causing the fibrous material to be extended between the electrodes by the action of the electrical field between said electrodes and to be thereby separated from the non-fibrous materials, and then causing the fibrous material to be mechanically moved out of the electrical field and away from the non-fibrous materials while maintaining the gaseous medium in contact with such non-fibrous materials in a quiet condition.

3. The method which consists in passing a mixture of asbestos and granular materials, part of said granular material being in finely divided condition, over a grounded supporting means, maintaining an electrostatic field between said supporting means and an electrode extending over the same and separated therefrom solely by a gaseous dielectric, so as to cause the asbestos fibers to be extended in the direction of the forces of said field and to extend from said supporting surface upwardly to and in contact with the overlying electrode and to be mechanically thereby separated from the granular materials, and removing the asbestos so separated from the electric field while maintaining the gaseous medium in contact with said granular materials in a quiet condition so as to avoid loss of finely divided material therefrom.

In testimony whereof I have hereunto subscribed my name this 17th day of November 1921.

GEORGE H. HORNE.